United States Patent
Turi

(10) Patent No.: US 7,273,005 B2
(45) Date of Patent: Sep. 25, 2007

(54) COFFEE GRINDER ASSEMBLY FOR A COFFEE MACHINE

(75) Inventor: Mariano Turi, Zurich (CH)

(73) Assignee: Saeco IPR Limited, Dublin (IE)

( * ) Notice: Subject to any disclaimer, the term of this patent is extended or adjusted under 35 U.S.C. 154(b) by 762 days.

(21) Appl. No.: 10/871,994

(22) Filed: Jun. 18, 2004

(65) Prior Publication Data

US 2005/0279219 A1 Dec. 22, 2005

(51) Int. Cl.
*A23L 1/00* (2006.01)

(52) U.S. Cl. .......................... 99/286; 99/275

(58) Field of Classification Search ............... 99/348, 99/509–511, 275–315, 289 R; 241/168, 241/169.1, 100, DIG. 27, 101.2
See application file for complete search history.

(56) References Cited

U.S. PATENT DOCUMENTS

| | | | | | |
|---|---|---|---|---|---|
| 3,327,615 | A | * | 6/1967 | Swan | 99/286 |
| 4,007,675 | A | * | 2/1977 | Cailliot et al. | 99/286 |
| 4,196,658 | A | * | 4/1980 | Takagi et al. | 99/286 |
| 4,624,177 | A | * | 11/1986 | Ito et al. | 99/286 |
| 4,936,515 | A | * | 6/1990 | Poag et al. | 241/36 |
| 4,967,649 | A | * | 11/1990 | Ephraim et al. | 99/286 |
| 5,058,814 | A | * | 10/1991 | Ephraim et al. | 241/152.2 |
| 5,417,145 | A | * | 5/1995 | Joseph et al. | 99/280 |
| 5,465,650 | A | * | 11/1995 | Friedrich et al. | 99/286 |
| 5,511,465 | A | * | 4/1996 | Friedrich et al. | 99/286 |
| 5,542,342 | A | * | 8/1996 | McNeill et al. | 99/280 |
| 5,615,601 | A | * | 4/1997 | Eugstar | 99/280 |
| 5,671,657 | A | * | 9/1997 | Ford et al. | 99/286 |
| 5,761,993 | A | | 6/1998 | Ling et al. | |
| 6,164,574 | A | | 12/2000 | Weibel | |

FOREIGN PATENT DOCUMENTS

| | | |
|---|---|---|
| DE | 945 410 C | 7/1956 |
| DE | 198 39 917 A | 3/2000 |
| EP | 1 065 962 B | 1/2001 |

* cited by examiner

*Primary Examiner*—Timothy F. Simone
(74) *Attorney, Agent, or Firm*—Maginot, Moore & Beck

(57) ABSTRACT

A coffee grinder assembly for a coffee machine comprises two coaxially arranged grinding wheels. One of the grinding wheels is driven by an electric motor, and the other one is stationary. For receiving the grinding wheels, two grinding wheel support members are provided. Each grinding wheel is provided with radially extending protrusions, and each grinding wheel support member is provided with corresponding recesses to form a bayonet closure. By such a design, the provision of connecting bores in the grinding wheels can be avoided, resulting in an enlarged effective grinding surface.

10 Claims, 2 Drawing Sheets

COFFEE GRINDER ASSEMBLY FOR A COFFEE MACHINE

BACKGROUND OF THE INVENTION

The present invention relates to a coffee grinder assembly comprising a housing, a first, lower grinding wheel support member and a first, lower grinding wheel, and a second, upper grinding wheel support member and a second, upper grinding wheel. At least one of the first and second grinding wheels is rotatably received in the housing.

The first, lower grinding wheel support member and the first, lower grinding wheel both comprise first cooperating connecting means for fixing the first, lower grinding wheel in the first, lower grinding wheel support member, and the second, upper grinding wheel support member and the second, upper grinding wheel both comprise second cooperating connecting means for fixing the second, upper grinding wheel in the second, upper grinding wheel support member.

Grinder assemblies of the kind referred to herein above consist mainly of plastic material, whereby the grinding wheels thereof are manufactured of a hard, non-abrasive material, for example of hardened steel. The quality of the coffee powder prepared with such grinder assemblies particularly depends on the wear resistance of the grinding wheels used in the grinder assembly, since, with progressive wear of the grinding wheels, the particle size of the coffee powder varies, resulting in decreasing quality both of the ground coffee powder and the coffee beverage prepared therewith.

In order to fix the grinding wheels in the associated grinding wheel support members, usually the wheels are provided with a plurality of bores, running through the grinding wheels and adapted to receive connecting means like screws, rivets or similar means. A disadvantage of providing connecting bores may be seen in the fact that they claim a substantial amount of the theoretically available grinding surface of the grinding wheel, because the toothing of the grinding wheel is interrupted by these bores. Moreover, the harder the grinding wheel is,—which is desirable per se—, the more difficult it is to machine these connecting bores in the grinding wheels. Finally, the provision of connection bores has the further disadvantage that coffee powder is collected both in the bores an in the connecting means; of course, this is not desired at all due to hygienic reasons.

PRIOR ART

The patent document EP 1,065,962 discloses a coffee grinder having a grinder assembly of the kind referred to herein above. The grinder assembly comprises a conical gear wheel as well as two coaxially arranged grinding wheels having a spiral-like toothing. One of the grinding wheels is stationary and the other one rotatable. Both grinding wheels are provided with connecting bores adapted to receive connecting screws by means of which the grinding wheels are fixed to the associated grinding wheel support members. In particular, FIG. 4 of this document clearly shows that the connecting bores are located in the region of the toothing of the grinding wheels.

U.S. Pat. No. 6,164,574 discloses a mill for grinding material such as salt grains or pepper corns whose coarseness can be adjusted and whose grinding gear can be disassembled for cleaning. The mill has a middle part which serves as a reservoir for the material to be ground and an upper part which is attachable to the middle part by means of an attachment and adjustment element. In addition, the mill has a lower part which is designed to unscrew from the middle part for the purpose of cleaning the grinding gear. The grinding gear includes both an upper grinding wheel which is disposed underneath on the middle part and a lower grinding wheel which is screwed together with the attachment and adjustment element through a pivot pin. The pivot pin is connected in a non-rotatable way to the upper part. Turning the upper part actuates the grinding gear.

For fixing the grinding wheels in its associated support member, the grinding wheels are provided with four recesses located along their periphery, which are engaged by correspondingly arranged cam members provided in the associated support member. Such a design shows the disadvantage that the grinding wheels cannot be positioned exactly neither in axial direction nor in radial direction, with the result that they can move within their support member under the influence of the torque forces occurring during the grinding operation.

OBJECTS OF THE INVENTION

It is an object of the present invention to provide a coffee grinder assembly for a coffee machine in which the grinding wheels do not have any connecting bores extending through the grinding wheel, whereby the grinding wheels are nevertheless exactly positioned and fixed both in axial and radial directions.

SUMMARY OF THE INVENTION

To meet these and other objects, the present invention provides a coffee grinder assembly comprising a housing, a first, lower grinding wheel support member and a first, lower grinding wheel, and a second, upper grinding wheel support member and a second, upper grinding wheel. At least one of the first and second grinding wheels is rotatably received in the housing.

The first, lower grinding wheel support member and the first, lower grinding wheel both comprise first cooperating connecting means for fixing the first, lower grinding wheel in the first, lower grinding wheel support member, and the second, upper grinding wheel support member and the second, upper grinding wheel both comprise second cooperating connecting means for fixing the second, upper grinding wheel in the second, upper grinding wheel support member.

Each of the first and second cooperating connecting means is designed as a rotational closure in which a mutual rotation of the first, lower grinding wheel support and the first, lower grinding wheel as well as of the second, upper grinding wheel support and the second, upper grinding wheel in each case provides for an interlocking closure that is driven in its locked position under the influence of the torque force occurring during the grinding operation.

By the provision of the above-mentioned rotational closure to fix each of the grinding wheels in its associated support member, the effective grinding surface of the grinding wheels is enlarged because space consuming connecting bores in the grinding wheels are avoided. Moreover, the difficult, time consuming drilling of the connecting bores can be avoided, which is a particular advantage in the case of very hard grinding wheels. Furthermore, it is ensured that the grinding wheels cannot become loose under the influence of the torque forces occurring during the grinding operation, but are even more firmly seated and positioned in the associated grinding wheel support. Finally, by the design according to the invention, the requirements of hygiene in the grinding and cutting area are also considered.

In a preferred embodiment of the invention, the grinding wheels comprise radially extending protrusions, cooperating with corresponding recesses provided in the associated support members in the kind of a bayonet closure. Such grinding wheels can be fixed in the associated supports quickly and easily.

BRIEF DESCRIPTION OF THE DRAWINGS

In the following, an embodiment of the grinder assembly according to the invention will be further described, with reference to the accompanying drawings, in which.

DETAILED DESCRIPTION OF A PREFERRED EMBODIMENT

Figure 1:
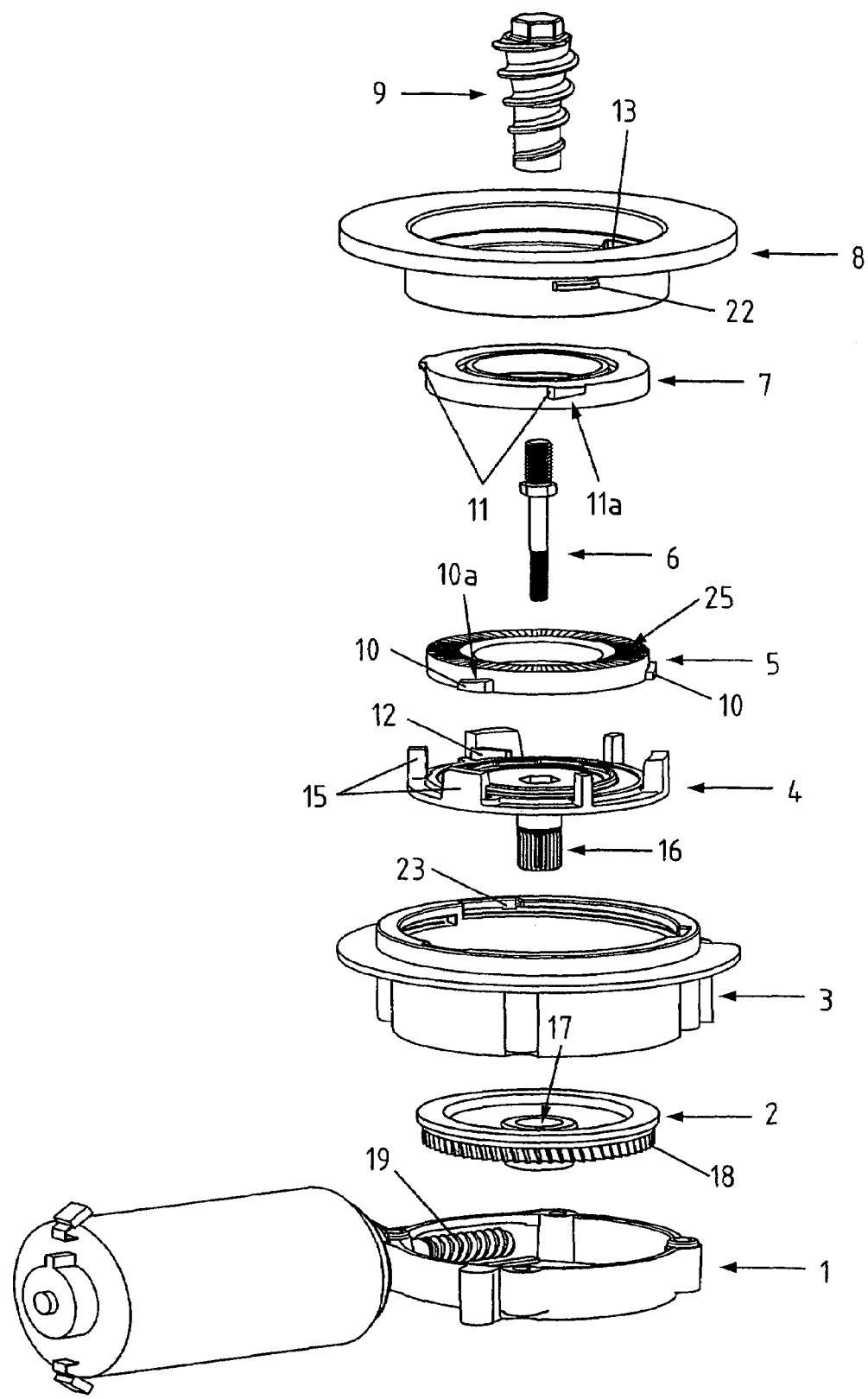
FIG. 1 shows an exploded view of the coffee grinder assembly.

The coffee grinder assembly according to FIG. 1 essentially comprises an electric driving motor 1, a driven rotating disc 2, a housing 3, a lower grinding wheel support 4, a lower grinding wheel 5, a shaft 6, an upper grinding wheel 7, an upper grinding wheel support 8 and a feed screw 9. The screws required for interconnecting the above mentioned parts as well as further elements like sealing elements, bearings etc. are not shown in favor of clarity.

Since the design and the operation of such coffee grinding assemblies are well known to any person skilled in the art, in the following, only the characteristics essential to the present invention are further discussed.

The lower and upper grinding wheel supports 4, 8 preferably are made of plastic material and serve for receiving and fixedly supporting the lower and upper grinding wheels 5, 7, respectively. Instead of bores for fixing the respective grinding wheel to its associated grinding wheel support, as it is provided for in the coffee grinder assemblies according to the prior art, both grinding wheels 5, 7 are provided with radially projecting elements 10, 11 for fixing the grinding wheel to its associated grinding wheel support 4,8.

Both the lower and upper grinding wheel supports 4, 8 are provided with recesses 12, 13 corresponding in size and position to the radially projecting elements 10, 11 provided on the grinding wheels 5, 7. The radially projecting elements 10, 11 engage the recesses 12, 13 and establish therewith a bayonet interlocking. In the exploded view of FIG. 1, the recesses 12, 13 provided in the lower and upper grinding wheel supports 4, 8 are barely visible since they are hidden. Both the recesses 12, 13 and the radial projections 10, 11 are provided with an oblique wedge surface 10a, 11a, with the result that the lower and upper grinding wheels 5, 7 are axially, i.e. in direction of the longitudinal central axis of the grinding assembly, pressed into the associated grinding wheel supports 4, 8 upon mutual rotation of the grinding wheel and the grinding wheel support to engage the bayonet closure.

The lower grinding wheel support 4 is provided with six vertically extending protrusions 15. Three of them comprise the previously mentioned slot-shaped recesses 12, serving to receive and fix the lower grinding wheel 5 by means of the radially extending protrusions 10 thereof. The upper grinding wheel support 8 is provided with three slot-shaped recesses 13 as well, serving to receive and fix the upper grinding wheel 7 by means of the radially extending protrusions 11 thereof. The slot-shaped recesses 12 both provided in the lower grinding wheel support 4 and the upper grinding wheel support 8, however, are only partially visible in the illustration of FIG. 1. The slot-shaped recesses 12, 13, together with the radially extending protrusions 10, 11 of the respective grinding wheel 5, 7, establish some sort of bayonet locking mechanism and are designed in such a way that the grinding wheels 5, 7 are firmly hold in the recesses 12, 13 under the influence of the torque exerted during operation of the grinding wheels 5, 7 on the radially extending protrusions 10, 11. In order to radially center the grinding wheels 5, 7, both of them are provided with an annular recess 21, engaging annular protrusions 20 provided in the lower and upper grinding wheel supports 4, 8, respectively, as will be explained in more detail herein after.

Both the lower grinding wheel 5 and the upper grinding wheel 7 are provided with a toothing 25 in each case provided on that surface of the grinding wheel 5, 7 that faces the opposite grinding wheel 7,5. In the exploded view of FIG. 1, however, only the toothing 25 on the upper surface of the lower grinding wheel 5 is visible, but it is understood that the upper grinding wheel 7 has a corresponding toothed lower surface. Both grinding wheels 5, 7 preferably consist of a ceramic base material that is very wear resistant and provides a much longer useful service life than conventional grinding wheels made of hard metal. Thus, even under heavy-duty conditions, the grinding wheels 5, 7 normally do not have to be replaced during the usual lifetime of the coffee grinder. Due to the provision of the radially extending protrusions 10, 11 provided at the periphery of the grinding wheels 5, 7, the need is removed to provide for connecting bores in the grinding wheels 5, 7; the result is that the effective grinding surface is considerably enlarged and the costly and difficult drilling of the hard, ceramic grinding wheels 5, 7 is not required.

In order to provide for a positive interconnection between the lower grinding wheel support 4 and the rotating disc 2 driven by the electric motor 1, the lower grinding wheel support 4 comprises a protrusion 16 provided with an peripheral toothing, the protrusion 16 being adapted to engage a bore 17 provided in the rotating disc 2 and having a corresponding inner toothing. The rotating disc 2 is driven by the electric motor 1 having a worm gear wheel 19 engaging a peripheral toothing 18 provided on the rotating disc 2.

In contrast to the lower grinding wheel support 4, the upper grinding wheel support 8 is non rotatable, but fixed to the housing 3. To prevent a rotation of the upper grinding wheel support 8, it comprises cams 22 engaging correspondingly located recesses 23 provided in the housing 3. The upper feed screw 9, finally, is screwed onto the threaded upper end of the shaft 6, while the lower threaded end of the shaft 6 is fixed to the rotating disc 2 by means of a (not shown) nut.

Preferably, the bottom side of the rotating disc 2 can be provided with permanent magnets (not shown), cooperating with a sensor (not shown) fixed to the housing to measure the number of the revolutions when the coffee grinder is operated. Thus, the number of the revolutions performed by the lower grinding wheel 5 during a coffee grinding cycle establishes a measure for determining the amount of coffee ground during one operating cycle.

Figure 2:
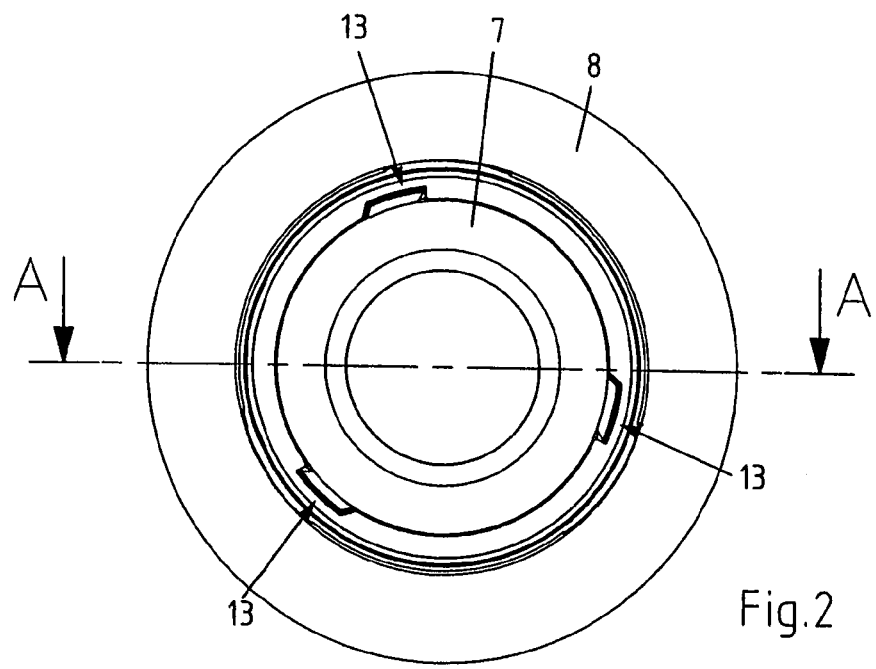
FIG. 2 shows a top view of the upper grinding wheel support incorporating a grinding wheel fixed thereto.
Figure 3:
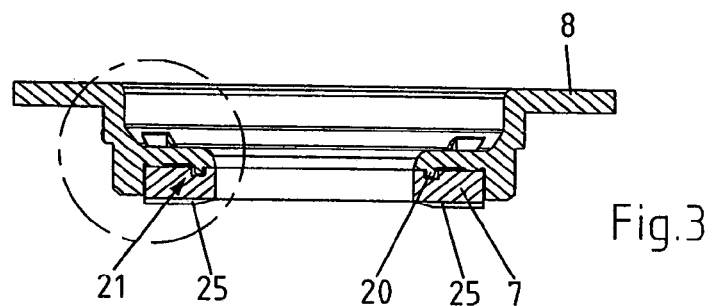
FIG. 3 shows a longitudinal sectional view of the upper grinding wheel support incorporating a grinding wheel fixed thereto as shown in FIG. 2.

FIG. 2 shows a top view of the upper grinding wheel support 8 with the upper grinding wheel 7 fixed thereto, while FIG. 3 shows a cross sectional view of the grinding wheel support 8 and the grinding wheel 7 taken along line A-A in FIG. 2. FIG. 2 clearly shows the slot-shaped recesses 13 provided in the upper grinding wheel support 8 which are engaged by the radially extending projections 10 provided on the grinding wheel 7 (cf. FIG. 1) for fixedly connecting the upper grinding wheel 7 to the support 8. In FIG. 3, particularly the annular protrusion 20 provided on the upper grinding wheel support 8 and the corresponding annular recess 21 provided on the upper grinding wheel 7 for centering the upper grinding wheel 7 with respect to the upper grinding wheel support 8 are clearly shown. Upon inserting the upper grinding wheel 7 into the upper grinding wheel support 8, the protrusion 20 of the support 8 engages the recess 21 of the grinding wheel 7 and radially aligns the latter one with regard to the support 8. Corresponding protrusions and recesses are provided on the lower grinding wheel support 4 and the lower grinding wheel 5 as well, with the result that the two grinding wheels 5, 7 are coaxial once the grinder assembly has been finally assembled.

Figure 4:
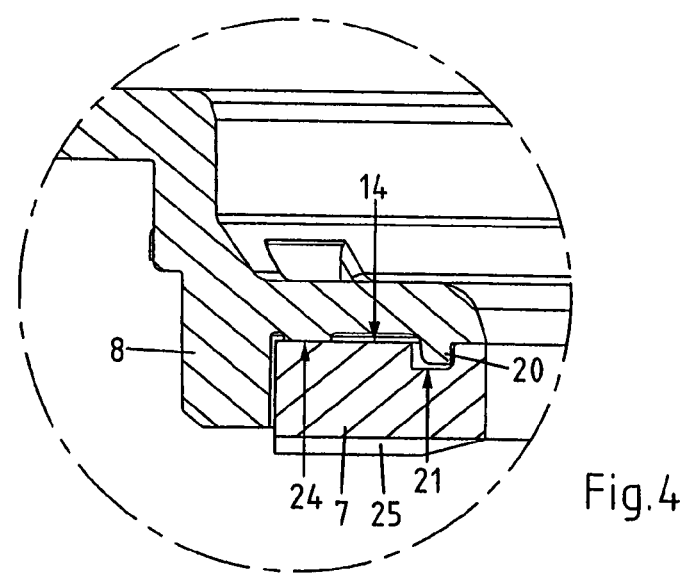
FIG. 4 shows an enlarged portion of the sectional view of FIG. 3.

FIG. 4 shows an enlarged portion of FIG. 3. In this view, it can be seen that the grinding wheel 7 is provided with a smooth back surface 14, serving, amongst else, as a support face. In turn, the grinding wheel support 8 comprises an annular support surface 24 facing the grinding wheel 7, supporting the grinding wheel 7 in axial direction, i.e. in the direction of the central longitudinal axis of the coffee grinder assembly. Simultaneously, the annular support surface 24 serves for positioning the grinding wheel 7 in axial direction.

Due to the torque force acting on the grinding wheel 7 during the grinding operation, the wheel 7 is loaded in locking direction; in other words, by choosing a proper sense of rotation of the grinding wheel and due to the design of the rotational locking mechanism, the grinding wheel 7 is loaded in locking direction. Thereby, the grinding wheel 7 is firmly fixed in the grinding wheel support 8 and it is ensured that the grinding wheel 7 does not become loose unintentionally. Moreover, due to this load, it is also ensured that the rear side of the grinding wheel 7 is moved against the supporting surface 24 of the grinding wheel support 8 and rests there against without play. The result is that no coffee dust can accumulate between the grinding wheel 7 and the grinding wheel support 8. It is understood that all of the above is also true in connection with grinding wheel 5 and its associated support 4.

In FIG. 4, moreover, the annular protrusion 20 of the grinding wheel support 8 is clearly visible, engaging the annular recess 21 provided in the grinding wheel 7 and ensuring that the grinding wheel 7 is exactly radially positioned with regard to the support 8.

Instead of the bayonet locking mechanism with radially projecting locking members discussed herein above, other types of rotational locking mechanisms can be used for locking the grinding wheel with regard to its associated support member. For example, a threaded locking mechanism could be used for fixing the grinding wheel to the associated support member. On the other side, the locking means could be arranged in axial direction on the grinding wheel, particularly on its rear surface facing the associated support member. Also, a central location of a protrusion or several protrusions would be possible. Finally, it is understood that the locking mechanism could be designed in a kinematically opposite manner: The grinding wheels could be provided with a recess or with several recesses, and the associated support member could comprise one or several corresponding protrusions engaging these recesses in the grinding wheel.

What is claimed is:

1. A coffee grinder assembly comprising:
   a housing;
   a first, lower grinding wheel support member and a first, lower grinding wheel;
   a second, upper grinding wheel support member and a second, upper grinding wheel;
   at least one of said first and second grinding wheels being rotatably received in said housing;
   said first, lower grinding wheel support member and said first, lower grinding wheel both comprising first cooperating connecting means for fixing said first, lower grinding wheel in said first, lower grinding wheel support member;
   said second, upper grinding wheel support member and said second, upper grinding wheel both comprising second cooperating connecting means for fixing said second, upper grinding wheel in said second, upper grinding wheel support member;
   each of said first and second cooperating connecting means being designed as a rotational closure in which a mutual rotation of said first, lower grinding wheel support member and said first, lower grinding wheel as well as of said second, upper grinding wheel support member and said second, upper grinding wheel in each case provides for an interlocking closure that is driven in its locked position under the influence of the torque force occurring during the grinding operation.

2. A coffee grinder assembly according to claim 1 in which said second, upper grinding wheel support member is provided with a supporting surface facing said second, upper grinding wheel, and in which said second, upper grinding wheel is provided with a smooth rest surface facing said second, upper grinding wheel support member, whereby said second, upper grinding wheel is pressed against said supporting surface of said second, upper grinding wheel support member under the influence of the torque force occurring during the grinding operation.

3. A coffee grinder assembly according to claim 1 in which each of said first and second grinding wheels is provided with radially extending protrusions, and each of said first and second grinding wheel support members is provided with correspondingly located recesses, said protrusions of said first grinding wheel engaging said recesses of said first grinding wheel support members to thereby form a first bayonet closure, and said protrusions of said second grinding wheel engaging said recesses of said second grinding wheel support member to thereby form a second bayonet closure.

4. A coffee grinder assembly according to claim 3 in which said protrusions of said first and second grinding wheels comprise an oblique wedge surface which axially position the grinding wheel in the associated grinding wheel support member and press the grinding wheel axially against said supporting surfaces provided on the associated grinding wheel support member.

5. A coffee grinder assembly according to claim 1 in which each of said first and second grinding wheels is provided with centering means for radially positioning the grinding wheel in the associated grinding wheel support member.

6. A coffee grinder assembly according to claim 5 in which said centering means of said first and second grinding wheel comprises an annular recess, the associated grinding wheel support member being provided with a corresponding annular protrusion engaging said annular recess of the grinding wheel for radially centering said grinding wheel with respect to the associated grinding wheel support member.

7. A coffee grinder assembly according to claim 5 in which said centering means of said first and second grinding wheel comprises an annular protrusion, the associated grinding wheel support member being provided with a corresponding annular recess engaging said annular protrusion of the grinding wheel for radially centering said grinding wheel with respect to the associated grinding wheel support member.

8. A coffee grinder assembly according to claim 1 in which said first and second grinding wheels are made of a ceramic base material.

9. A coffee grinder assembly according to claim 1 in which said first and second grinding wheels are made of a carbide or carbide alloy material.

10. A coffee grinder assembly according to claim 1 in which said second, upper grinding wheel is stationary and said first, lower grinding wheel is driven by an electric motor.

\* \* \* \* \*